United States Patent
Klein et al.

(10) Patent No.: US 6,631,374 B1
(45) Date of Patent: Oct. 7, 2003

(54) SYSTEM AND METHOD FOR PROVIDING FINE-GRAINED TEMPORAL DATABASE ACCESS

(75) Inventors: Jonathan D. Klein, Redwood City, CA (US); Amit Ganesh, San Jose, CA (US); Juan R. Loaiza, Redwood City, CA (US); Gary C. Ngai, Saratoga, CA (US)

(73) Assignee: Oracle Corp., Redwood Shores, CA (US)

( * ) Notice: Subject to any disclaimer, the term of this patent is extended or adjusted under 35 U.S.C. 154(b) by 329 days.

(21) Appl. No.: 09/676,305

(22) Filed: Sep. 29, 2000

(51) Int. Cl.[7] .................................................. G06F 17/30
(52) U.S. Cl. ........................................... 707/8; 707/201
(58) Field of Search ................................. 707/201, 202, 707/203, 8

(56) References Cited

U.S. PATENT DOCUMENTS

| | | | | |
|---|---|---|---|---|
| 5,280,612 A | * | 1/1994 | Lorie et al. ..................... | 707/8 |
| 5,317,731 A | * | 5/1994 | Dias et al. ...................... | 707/8 |
| 5,347,653 A | * | 9/1994 | Flynn et al. ................... | 707/203 |
| 5,440,730 A | | 8/1995 | Elmasri et al. | |
| 5,701,480 A | * | 12/1997 | Raz ............................ | 709/101 |
| 5,873,102 A | | 2/1999 | Bridge, Jr. et al. | |
| 5,890,167 A | | 3/1999 | Bridge, Jr. et al. | |
| 5,907,848 A | * | 5/1999 | Zaiken et al. ................ | 707/202 |
| 5,956,731 A | * | 9/1999 | Bamford et al. ............. | 707/201 |
| 5,974,427 A | * | 10/1999 | Reiter ........................ | 707/203 |
| 6,012,060 A | * | 1/2000 | Loaiza et al. ................. | 707/10 |
| 6,018,746 A | | 1/2000 | Hill et al. | |
| 6,138,121 A | * | 10/2000 | Costa et al. ................. | 707/100 |
| 6,192,377 B1 | * | 2/2001 | Ganesh et al. .............. | 707/203 |
| 6,449,624 B1 | * | 9/2002 | Hammack et al. .......... | 707/203 |

FOREIGN PATENT DOCUMENTS

FR    2 746 526    9/1997

OTHER PUBLICATIONS

Lee C. et al, Temporal Grid File: A File Structure for Interval Data, Data & Knowledge Engineering, vol. 26, No. 1, May 1998, pp. 71–79, Taiwan.

Amagasa T. et al, Implementing Time–Interval Class for Managing Temporal Data, International Workshop on Database and Expert Systems Applications, Aug. 26, 2003, pp. 84,88, 843–849, Japan.

* cited by examiner

Primary Examiner—Safet Metjahic
Assistant Examiner—Haythim J. Alaubaidi
(74) Attorney, Agent, or Firm—Ditthavong & Carlson, P.C.

(57) ABSTRACT

A system and method for selectively viewing temporal row data in a consistent read-implemented database are described. Committed transactions effecting row data changes to a database are tracked and a stored system change number is assigned upon each committed transaction. Rollback segments for uncommitted transactions are stored. Each rollback segment stores a transaction identifier and transaction table entries containing ordered row data values reflecting the database changes. The database is transitioned into successive consistent versions responsive to each committed transaction at a journaled commit time. The transaction table entries are maintained for a user-definable retention period following the commit time of each committed transaction. A queried selection of row data values from the database is performed as of a query time occurring prior to the commit time of at least one committed transaction. The ordered row data values contained in the rollback segments storing a transaction identifier for the at least one committed transaction are retrieved.

43 Claims, 9 Drawing Sheets

Figure 7.

| First Name | Last Name | Department | City | State |
|---|---|---|---|---|
| Bob | Smith | Personnel | Seattle | WA |
| Ralph | Jones | Training | San Francisco | CA |
| John | Doe | Accounting | San Mateo | CA |
| Ernie | Roe | Sales | Palo Alto | CA |
| . . . | . . . | . . . | . . . | . . . |

SYSTEM AND METHOD FOR PROVIDING FINE-GRAINED TEMPORAL DATABASE ACCESS

FIELD OF THE INVENTION

The present invention relates in general to database access methodologies and, in particular, to a system and method for providing fine-grained temporal database access in a consistent read environment.

BACKGROUND OF THE INVENTION

Most corporate computing environments perform information dissemination, storage, and processing as core functions. Generally, to facilitate information exchange, these environments are made up of intranetworks of workstations and servers operating within a single physical location. Individual intranetworks can be interconnected with other intranetworks and computational resources. Geographically-displaced intranetworks are often interconnected to form internetworks which can also be interconnected with other internetworks. Public internetworks, such as the Internet, serve to interconnect users worldwide.

Databases are playing an increasingly central role in fulfilling and supporting the core functional areas. Most databases can be configured for networked computing environments. For instance, performance sensitive database applications can be configured to operate in parallel for maximum throughput and data availability. Distributed databases take advantage of interconnectivity to enhance performance and efficiency. Finally, mission critical data is often stored on redundant database systems that are frequently geographically distributed to ensure data security.

Fundamentally, all databases include a centrally located data store with an affiliated database server. Individual users can perform transactions directly on the database via the database server using some form of query language, such as the Structured Query Language (SQL). Alternatively, database applications operating on or in conjunction with the database server can provide a user friendly front end to improve data entry, interpretation, and retrieval.

In relational databases, data values are stored in tables organized according to a schema. The schema provides a mapping of the links between data sets and defines individual attributes. Related data values are stored in rows within the tables and each data value can be defined to store virtually any type of data object, including alphanumeric strings, numeric values, or binary data. Changes to the database accrue as transactions are executed. However, only those transactions actually committed to the database will effect permanent changes to the persistent data store. Uncommitted transactions are transitory and can be rolled back or undone.

Enabling committed transactions is an essential property of databases, particularly in multi-user database systems. Ordinarily, committed transactions cause permanent changes to the database, sometimes to the detriment of a user. Committed changes, whether caused by design or by error, accident, neglect, or malicious intent, are irreversible. The changed data becomes inaccessible for retrieval and viewing, even though a user may later want to access the original unchanged data.

In the prior art, there are three basic solutions to accessing or retrieving data irreversibly changed or deleted by committed transactions. Versioning disables operations that alter or delete data values in the persistent store. Instead, a new version of any changed row is created, thereby preserving the original data values as an older version of the row. However, this approach is space inefficient can drastically increase the storage requirements of a database, particularly where the database undergoes frequent change.

Point in time recovery offers a large grained, if imprecise, approach to database recovery. The entire database is restored from a backup copy and the data values in question are inspected. The database rows are replaced with the previously modified or deleted data. However, this approach typically requires two database systems upon which to execute and compare the data and also takes the active database off-line from data processing activities until the data values are restored.

Finally, log mining enables data recovery through inference. Some database systems incorporate transaction logs which track and record all operations performed against the database. Log mining allows those operations which have effected the data to be reconstructed back into database statements and, hopefully, transposed, so as to allow committed changes to be reversed.

Therefore, there is a need for an approach to accessing data values as of a time occurring prior to a committed transaction, either by a standardized time reference or by system change number.

There is a further need for an approach that will operate in a fine-grained manner to allow selective accessing of individual data values without requiring continuous versioning or wholesale database recovery. Moreover, such an approach would operate as a simple extension to a database language without statement reconstruction.

There is a further need for a self-servicing database system that will allow a user to repair data without database administrator assistance.

SUMMARY OF THE INVENTION

The present invention provides a system and method for temporally accessing data values in a database as of a requested query time. Transactions effecting the data values stored in the database are tracked and assigned a transaction identifier. Whenever a transaction makes a change to a relative database block (or simply, "data block"), the database engine creates an interested transaction entry which is stored in the relative database block. Each interested transaction entry references a transaction table entry storing the changed data values and transaction undo information. As each transaction is applied, a new database version is created A system change number is assigned when the transaction is committed.

An embodiment of the present invention is a system and method for providing fine-grained temporal database access in a consistent read environment. A database is transitioned into successive consistent versions by tracking transactions committed to the database. Each committed transaction generates a further consistent version of the database at a journaled commit time. Transaction table entries are stored for each uncommitted transaction. Each transaction table entry stores retained data values reflecting database changes. The transaction table entries are maintained for a retention period following the commit time of each transaction. A logical view of the database is presented as of a query time occurring prior to the commit time of at least one transaction by accessing the retained data values stored in the transaction table entries for the at least one transaction.

A further embodiment is a system and method for selectively viewing temporal row data in a consistent read-implemented database. Committed transactions effecting row data changes to a database are tracked and a stored system change number is assigned upon each committed transaction. Rollback segments for uncommitted transactions are stored. Each rollback segment stores a transaction identifier and transaction table entries containing ordered row data values reflecting the database changes. The database is transitioned into successive consistent versions responsive to each committed transaction at a journaled commit time. The transaction table entries are maintained for a user-definable retention period following the commit time of each committed transaction. A queried selection of row data values from the database is performed as of a query time occurring prior to the commit time of at least one committed transaction. The ordered row data values contained in the rollback storing a transaction identifier for the at least one committed transaction are retrieved.

Another further embodiment is a system and method for performing a logical select operation on temporal row data stored in a consistent read-implemented database. A record of database operations is maintained, including transactions effecting row data changes that have been committed into a database. Rollback segments for uncommitted transactions are stored. Each rollback segment stores a transaction identifier and information pertaining to effecting or restoring the database changes, including addresses for a undo entries containing row data values reflecting the database changes. The database is transitioned into successive consistent database versions responsive to each committed transaction at a journaled commit time. A system change number is assigned to the database version upon each committed transaction. The transaction table entries are retained for a user-definable retention period following the commit time of each committed transaction. A logical select operation is executed on the database for row data values as of a query time occurring prior to the commit time of at least one committed transaction. The ordered row data values stored in the undo entries are retrieved by referencing the transaction table entries at each address included in the interested transaction entry with the transaction identifier for the at least one committed transaction.

One benefit provided by the present invention is allowing self-servicing database repair. A user who accidentally deleted important rows from a table could execute a query as of a time prior to the accidental deletion, see the missing rows, and reinsert the deleted row into the current table.

Another benefit is enabling productivity applications, such as electronic mail and voice mail programs, to provide message restoration.

Still another benefit is providing decision support system and online analytical processing applications transaction restarting capabilities. These types of applications typically perform long runs of transaction processing. In the event of a crash, these applications could take advantage of temporal access to restart processing at the point where they left off prior to crashing.

Still another benefit allows applications to incorporate implicit versioning introduced by temporal access.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWING

FIG. 7 is a partial table view showing, by way of example, a set of employee data records.

DETAILED DESCRIPTION

Figure 1:
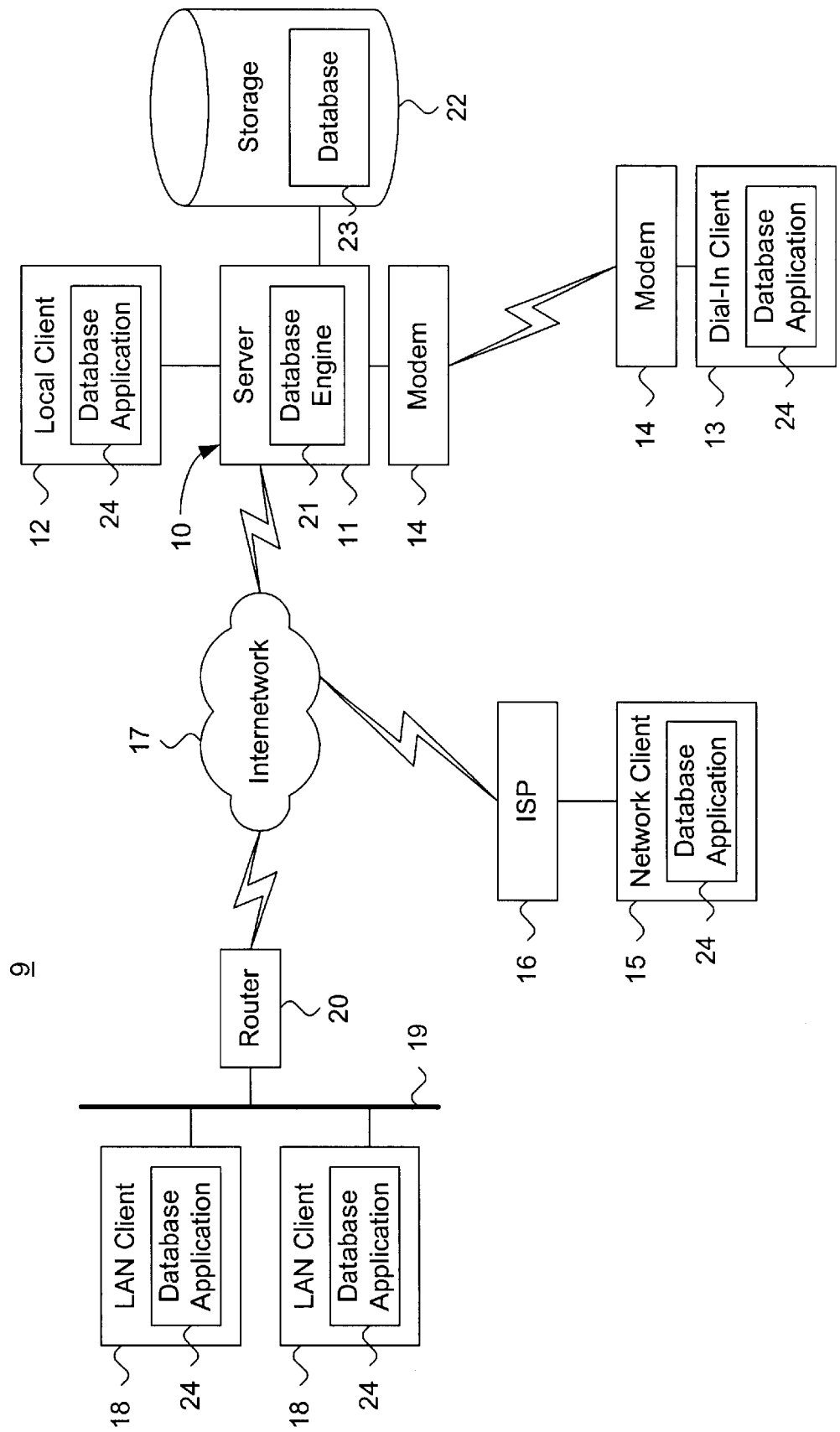
FIG. 1 is a block diagram showing a distributed computing environment, including a system for providing fine-grained temporal database access in a consistent read environment, in accordance with the present invention.

FIG. 1 is a block diagram showing a distributed computing environment 9, including a system 10 for providing fine-grained temporal database access in a consistent read environment, in accordance with the present invention. The system 10 consists of a database server 11 operating on a host computer system that provides database access to a plurality of clients.

Various types of clients can be interconnected to the database server 11. These clients include a local client 12 interconnected directly to the database server 11 and a dial-in client 13 interconnected via a set of modems 14. In addition, a network client 15 can be interconnected through an Internet service provider (ISP) 16 that is interconnected to the database server 11 via an internetwork 17, including the Internet. Similarly, one or more local area network (LAN) clients 18 can be interconnected to the database server 11 via an intranetwork 19 that is itself interconnected to the internetwork 17 via a router 20 or similar device. Other types of clients, network topologies and configurations, and forms of interconnection are feasible.

In addition to performing those tasks ordinarily associated with hosting network services, the database server 11 provides access to a database 23 maintained in a persistent storage 22 via a database engine 21, as further described below with reference to FIG. 2. Individual users can perform transactions via the clients directly on the database 23 through the database server 11 using some form of query language, such as the Structured Query Language (SQL). Alternatively, database applications 24 operating on each client or in conjunction with the database server 11 can provide a user friendly front end over which data can be entered, interpreted, and retrieved. In the described embodiment, the database engine 21 and database 23 form a relational database management system, such as the Oracle 8i product, licensed by Oracle Corporation, Redwood Shores, California.

The individual computer systems, including the database server 11 and clients 12, 13, 15, 18, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
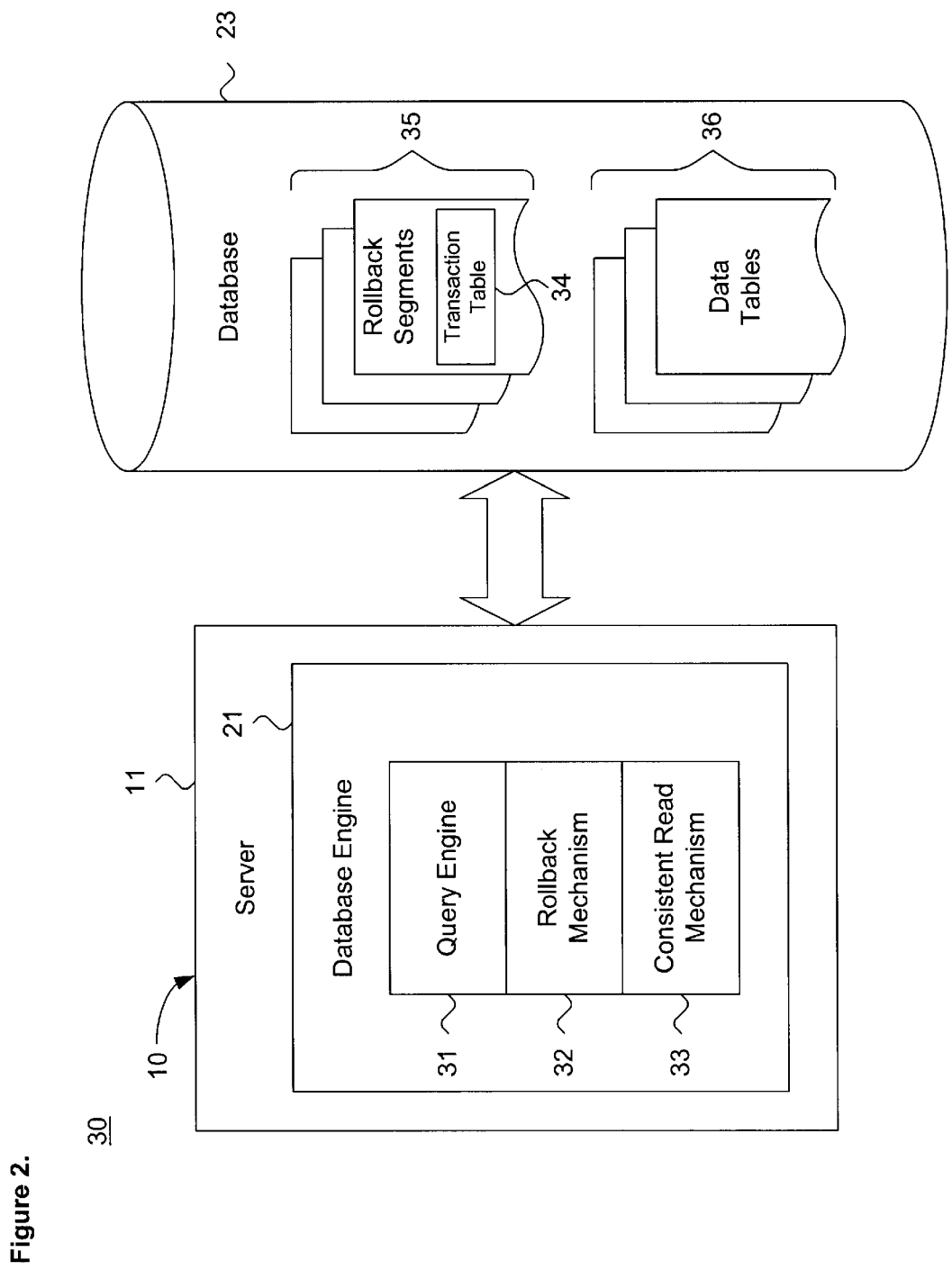
FIG. 2 is a detail block diagram showing the system for providing fine-grained temporal database access of FIG. 1.

FIG. 2 is a detail block diagram showing the system 10 for providing fine-grained temporal database access of FIG. 1. The system 10 consists of the database engine 21 and the database 23 proper. For purposes of describing the present invention, the database engine 21 is logically composed of three main components: query engine 31, rollback mechanism 32, and consistent read mechanism 33. The database engine 21 also includes other components (not shown), such as used to insert, modify, or delete, as well as to structure data attributes, as would be recognized by one skilled in the art. However, as the described invention most closely relates to database access, these components are omitted for the sake of simplicity and clarity of description.

The query engine 31 provides the basic functionality for interrogating the database 23 and retrieving data items from the data tables 36 stored therein. In the described embodiment, the query engine 31 interprets statements written in the SQL/PLI query language, although other query languages could also be used, rollback mechanism 32 and consistent read mechanism 33 together provide a capability to temporally access data values formerly stored in the database 23. Temporal access refers to the ability to perform queries on the database 23 as of a standardized time reference, such as the wall clock time, a time interval relative to the current wall clock time, such as "10 minutes ago" or "as of Aug. 28, 2000," or by system change number, described below. Provided the database 23 has sufficient information, all queries submitted to the database engine 21 would appear as reconstructed data value "snapshots" of the database 23 as of the time or system change number requested by the user, even though the actual data values themselves have been deleted or changed.

To create a consistent read environment shareable by multiple clients, the database engine 21 transitions the database 23 between consistent versions. Identical query results are guaranteed for any given system version number, irrespective of any transactions later executed on the database 23. Fundamentally, the database engine 21 executes transactions submitted by the clients. Those transactions that alter the data values maintained in the persistent storage 22 (shown in FIG. 1) only effect permanent, that is, irreversible, changes to the data values in the data tables 36 upon being "committed" to the database 23. Each committed transaction causes the database engine 21 to generate a new version of the database 23 identified by a system change number at a journaled commit time, as further described below with reference to FIG. 6.

The consistent read environment enables temporal access into the database 23. The database engine 21 tracks transactions effecting the database 23 via the rollback mechanism 32. Uncommitted transactions are stored separately from the data tables 36 in transaction table entries, as further described below with reference to FIG. 4, stored in rollback segments 35. The rollback segments 35 enable the database server 11 to provide graceful recovery in the event of a system crash. Thus, uncommitted transactions cannot harm the database 23 or cause inconsistent results.

The rollback mechanism 32 journals transactions in a transaction table 34 stored preferably as the first block in each rollback segment 35. The actual data value changes are stored as linked transaction table entries that are retained for a user-definable retention period past the commitment time for the affiliated transaction. Any given transaction journaled in the transaction table 34 can have one or more associated transaction table entries within which the actual changed data values are stored.

The consistent read mechanism 33 references the transaction table entries, also referred to as "undo" blocks, to provide temporal access. The consistent read mechanism iterates through the transaction table entries to provide a selective temporal view of row data as of a given time, relative time, or system change number, as further described below with reference to FIG. 9.

Each component 31, 32, 33 of the database engine 21 is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. In particular, the consistent read mechanism 33 operates in accordance with a sequence of process steps, as further described below beginning with reference to FIG. 9.

Figure 3:
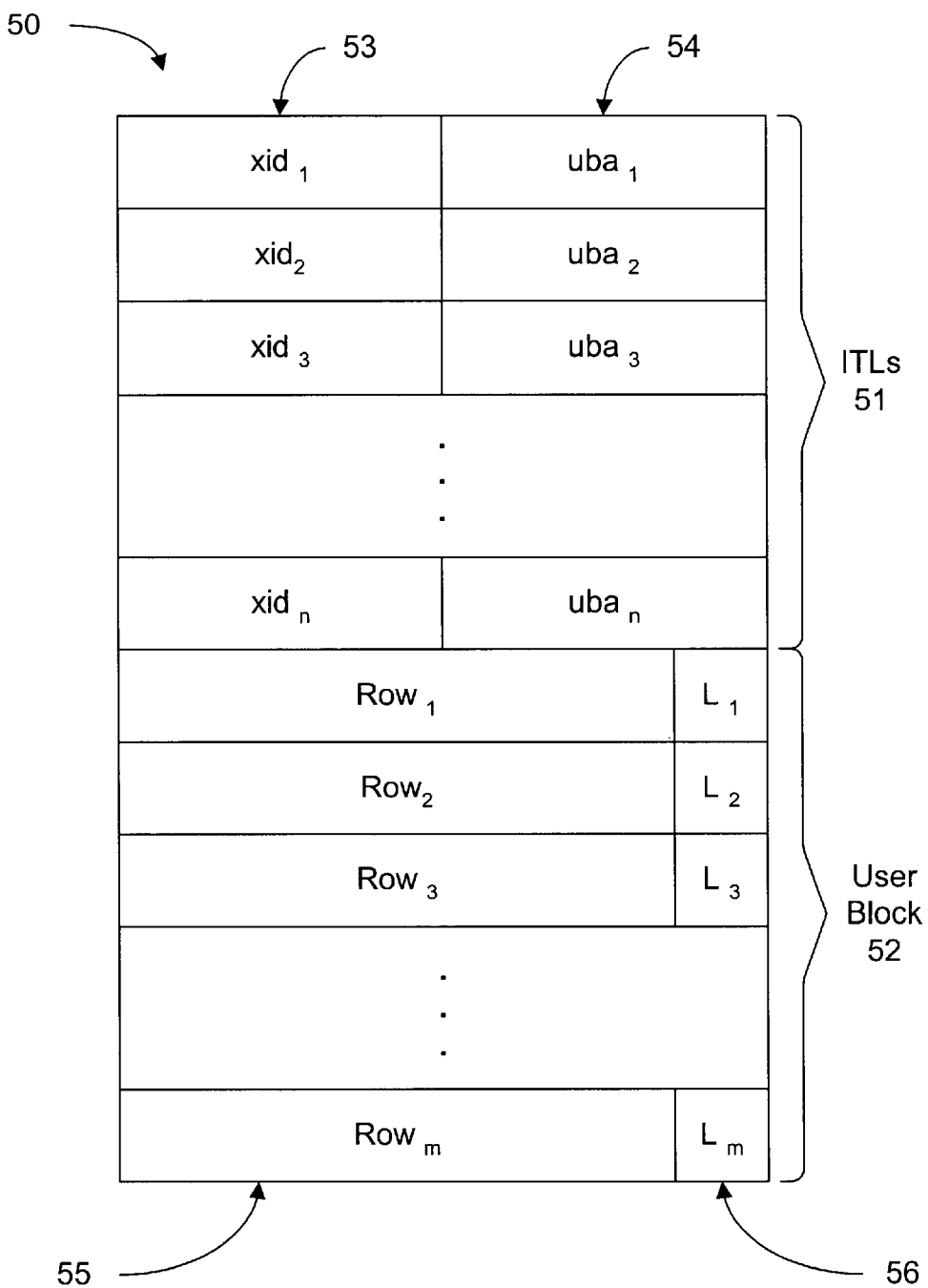
FIG. 3 is a data structure diagram showing the structure of a relative database block for use in the database of FIG. 2.

FIG. 3 is a data structure diagram showing the structure of a relative database block ("data block") 50 for use in the database 23 of FIG. 2. The relative database block 50 contains two sets of records: an interested transaction entry (ITE) 51 and a user block 52. Each ITE 51 stores a transaction identifier (xid) 53 and an associated user block address (uba) 54. The xid 53 identifies a transaction effecting a change to the data values in the database 23. The uba 54 contains the address of a row 55 contained in the user block 52 storing references to one or more transaction table entries. The relative database block 50 can store one or more ITEs 51.

The user block 52 contains rows 55 and lock bits 56. The rows 55 store the data values and the lock bit 56 indicates whether the row 55 is locked from modification. Each ITE 51 is associated with a user block 52.

Figure 4:
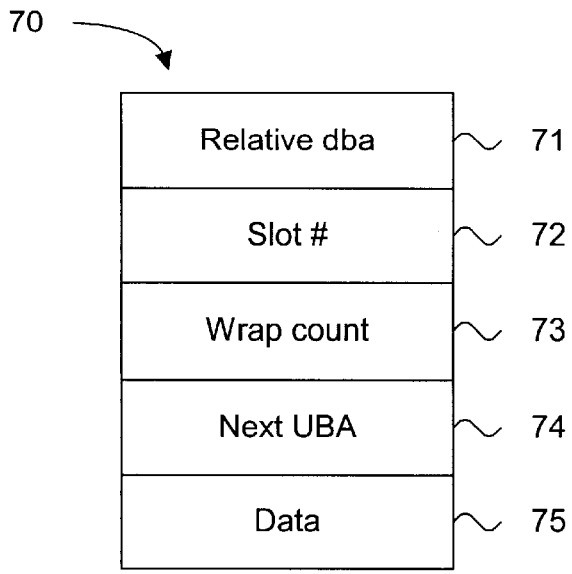
FIG. 4 is a data structure diagram showing the structure of a transaction table entry for use in the database of FIG. 2.

FIG. 4 is a data structure diagram showing the structure of a transaction table entry 70 for use in the database 23 of FIG. 2. Transaction table entries 70 are stored as a singly-linked list and each contain at least part of the data values required to rollback a transaction. Each transaction table entry 70 stores a relative database block address (rdba) 71, slot number 72, wrap count 73, a pointer to the next transaction table entry (uba) 74 (reflecting the next earlier change), and the actual data 75. The relative database block 71 refers to the database block within the data tables 36 to which the transaction table entry 70 relates. The slot number 72 further identifies a specific location with the database block and the wrap count 73 indicates the number of contiguous slots occupied by the record within the identified database block. The actual data 75 details the actual data values by address and content, as further described below with reference to FIG. 7.

Figure 5:
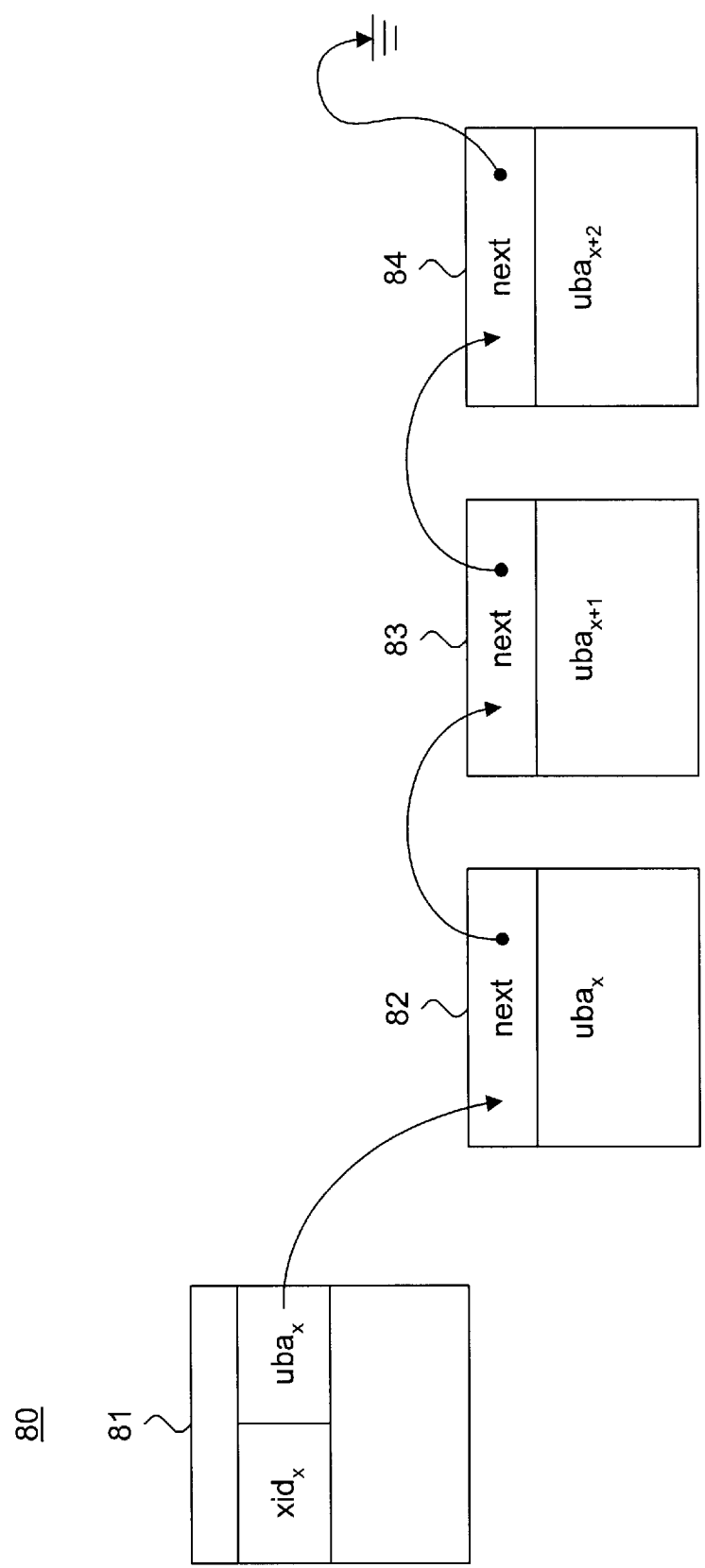
FIG. 5 is a functional block diagram showing the relationship between a transaction table and rollback segments.

FIG. 5 is a functional block diagram 80 showing the relationship between a transaction table 81 and transaction table entries 82, 83, 84. Each transaction includes a transaction identifier $xid_x$ and a user block address $uba_x$. The user block address $uba_x$ references an initial transaction table entry $uba_x$ 82. Each transaction table entry $uba_x$ is linked as a singly-linked list to next transaction table entries $uba_{x+1}$ and $uba_{x+2}$. Other forms of dynamically allocable data storage are feasible.

In the described embodiment, the rollback segments 35 are stored in extents. Each extent is a block of contiguous memory locations which have an associated expiration time. The expiration time is used by a database storage manager to indicate a time after which the extent can be overwritten with new data. Preferably, the retention time of each transaction table entry does not exceed the expiration time. Write operations take precedence and will overwrite transaction table entries if necessary after the expiration time has elapsed. Overwritten transaction table entries will cause temporal access requests to fail for unavailable data.

Figure 6:
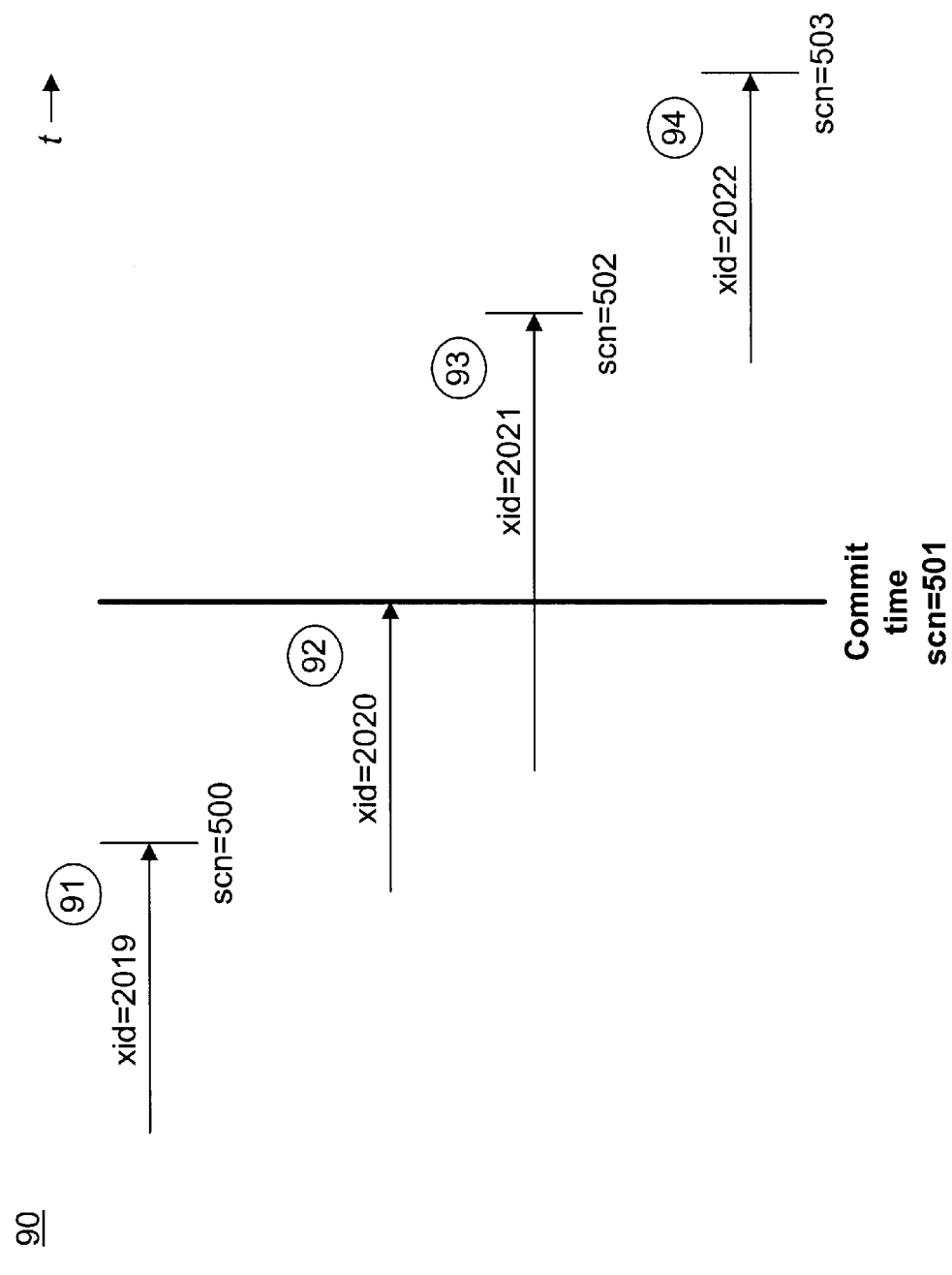
FIG. 6 is a timing diagram showing, by way of example, consistent read operations.

FIG. 6 is a timing diagram 90 showing, by way of example, consistent read operations. Every transaction effecting the data values stored in the database 23 (shown in FIG. 2) is tracked assigned a transaction identifier xid and journaled in the transaction table 34. The database 23 is transitioned to a new consistent version at the time that the transaction is committed to persistent storage 22 (shown in FIG. 1).

A read operation executed on the database 23 will access only committed data values and those data values changed by uncommitted transactions of the requesting client only. Consequently, consistent read results are guaranteed. For example, an earlier transaction 91 with an xid of 2019 will generate a system change number (scn) of 2019. Similarly, a pending transaction 93 and a subsequent transaction 94 with respective xids of 2021 and 2022 will generate system change numbers of 502 and 503. Only the committed transaction 92 with an xid of 2020 will generate a system change number of 501 at commit time.

Figure 8:
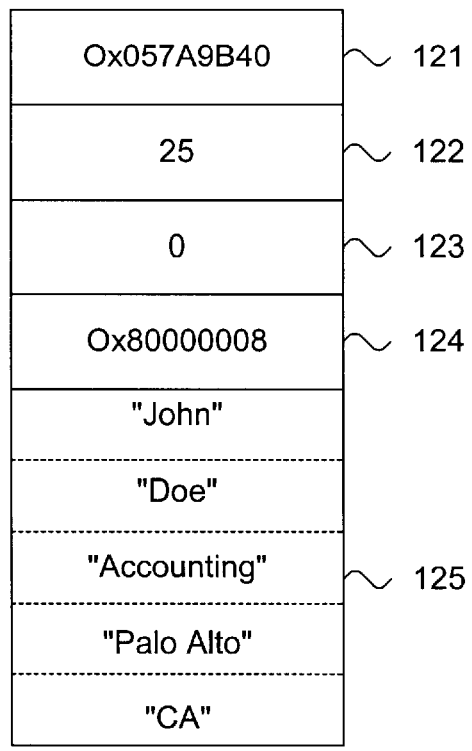
FIG. 8 is a data structure view showing, by way of example, a transaction table entry for a deleted employee data record.

FIG. 7 is a partial table view 100 showing, by way of example, a set of employee data records 106. Each employee data record 106 contains five fields of data values 101–105: first name 101, last name 102, department 103, and city 104 and state 105 of residence. By way of example, if the last employee data record 110 is deleted, a transaction is created and a interested transaction entry 51 (shown in FIG. 3) is allocated, such as shown in the data structure view 120 of FIG. 8. The relative data block address (rdba) 121 and slot number 122 contain the address "0x057A9B40" and slot of the data block within the data tables 36 (shown in FIG. 2) to which the transaction table entry belongs. A wrap count 123 of zero indicates only one data block is used. The next earlier transaction table entry 124 is located at "0x80000008." The actual data 126 is broken up into five pieces for the individual data values for each field in the deleted record.

Upon temporal access, the data values stored in the transaction table entry logically replace the data values currently stored in the relative database block as of the requested query time. For instance, an SQL query might be:

Select first name, last name from employee as of yesterday where department is "accounting"

This select transaction generate a result of "John Doe." Note that a relative query time of "yesterday" is used in place of a formatted date and time string.

Figure 9:
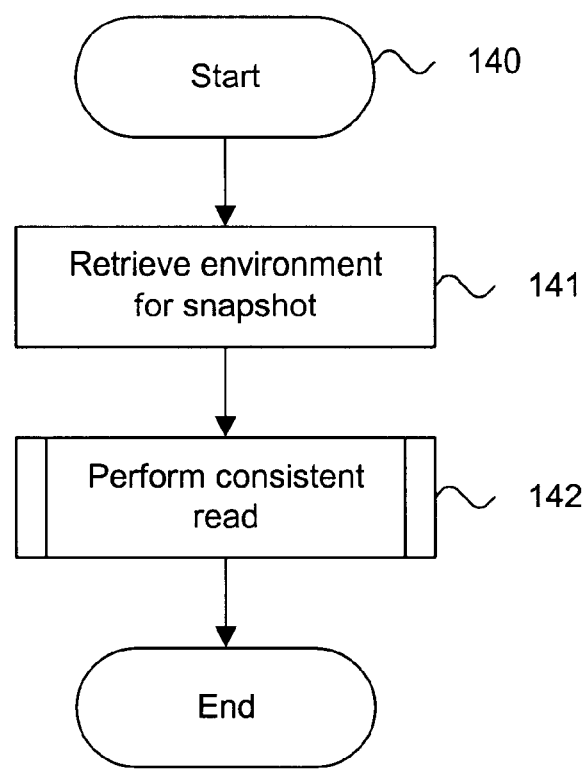
FIG. 9 is a flow diagram showing a method for providing fine-grained temporal database access in a consistent read environment in accordance with the present invention.

FIG. 9 is a flow diagram showing a method for providing fine-grained temporal database access 140 in a consistent read environment in accordance with the present invention. As would be readily recognized by one skilled in the art, a typical database engine could be concurrently processing multiple transaction operations at any given time. The described invention implicates read operations and does not directly effect the processing of other forms of database transactions. Consequently, the method will be described with respect to read operations.

A temporal access provides a logical view of retrieved data values as a "snapshot" taken as of the requested access time. Thus, the environment of the snapshot must first be retrieved (block 141) from the transaction table 34 (shown in FIG. 2). The environment includes the transaction identifier xid, relative user block address rdba, and system change number scn as of the requested query time. Upon the retrieval of the environment, a consistent read is performed (block 142), as further described below with reference to FIG. 10.

In the described embodiment, the query time can be requested in three forms. First, the query time can be with reference to a standardized time reference, such as a wall clock time or Greenwich mean time. Alternatively, the query time can be relative to a standardized time reference. Finally, a system change number could be used in lieu of a query time. A daemon process operates in the background to correlate system change numbers to commit times. The precise format of the query time can include literal strings, such as "Aug. 28, 2000 14:00:00," meaning as of precisely 2:00 pm on Aug. 28, 2000. Other formats and query time forms could be used.

Figure 10:
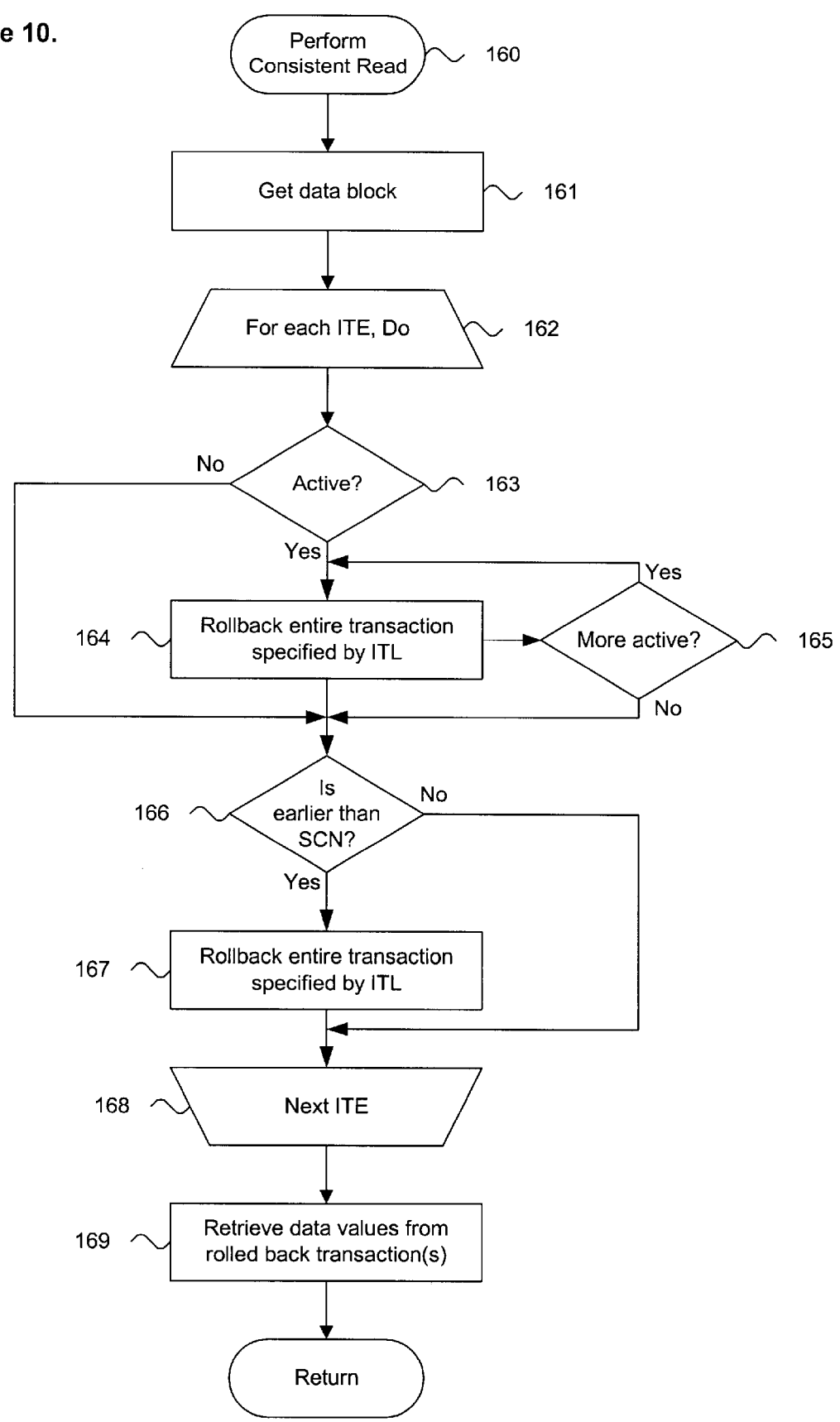
FIG. 10 is a flow diagram showing a routine for performing a consistent read operation for use in the method of FIG. 7.

FIG. 10 is a flow diagram showing a routine for performing a consistent read operation 160 for use in the method 140 of FIG. 7. The purpose of this routine is to access the retained data values stored in the transaction table entries 35 (shown in FIG. 2) associated with the system change number for the database 23 as of the requested query time. First, the relative database block is retrieved (block 161) from the persistent storage 22. Next, each interested transaction entry (ITE) 51 (shown in FIG. 3) is iteratively processed (blocks 162–169) to logically reconstruct the database 23 as of the requested query time. Note that although iterative flow control is described, other forms of flow control, including recursion, distributed, concurrent, and similar control schemes could also be applied.

For each ITE 51, transactions are rolled back in an ordered manner. Active transactions are rolled back before committed transactions (blocks 163–165) and only those committed transactions occurring earlier, that is, more recently, than the system control number (blocks 166–167) are rolled back. Thus, if the transaction referenced by the transaction identifier xid is active (block 163), the entire transaction is rolled back to logically undo the transaction (block 164). If there are more active transactions (block 165), the rollback is repeated (block 165) until all active transactions have been rolled back. Note that the operation of rolling back an entire transaction can itself require that a consistent read operation be performed and the routine 160 can be iteratively invoked as many times as necessary to undo transactions.

Once all active transactions have been rolled back (blocks 163–165), if the transaction occurred earlier than the system change number corresponding to the requested query time (block 166), the entire transaction is also rolled back to logically undo the transaction (block 167) and the next ITE 51 is processed (block 168). As before, the roll back operation can require additional consistent read operations.

Otherwise, if the transaction has been committed (block 163) and transaction commit time is later than the system change number as of the requested query time (block 166), the next ITE 51 is processed (block 168). The processing of ITEs (blocks 162–168) continues until no uncommitted or temporally subsequent transactions remain.

The retrieved data values from the rolled back transactions are provided (block 169). In the described embodiment, the data values are retrieved on a row-oriented basis, although the transaction table entries could be refined to a finer grain to store tuple or cell changes. Similarly, the transaction table entries could also store record, table, or schema changes. As well, the temporal access operations operate on a single table as of a fixed point in time. The query semantics could be extended to embrace one or more simultaneous temporal data sets, multiple tables, conjunctive and disjunctive selects, and to include objects, cells, rows, records, tables, windows, and schemas. After presenting the retrieved data values, the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing fine-grained temporal database access in a consistent read environment, comprising:

a database engine tracking transactions committed to the database as successive consistent versions, each committed transaction generating a further consistent version of the database at a journaled commit time;

a rollback mechanism storing transaction table entries for each uncommitted transaction, each transaction table entry storing retained data values reflecting database changes;

a consistent read mechanism maintaining the transaction table entries for a user-definable retention period following the commit time of each transaction and presenting a logical view of the database as of a query time occurring prior to the commit time of at least one transaction by accessing the retained data values stored in the transaction table entries for the at least one transaction.

2. A system according to claim 1, wherein each transaction table entry further comprises a transaction identifier, further comprising:

the consistent read mechanism selectively retrieving the retained data values from the transaction table entries for only those such at least one transaction corresponding to a transaction identifier substantially contemporaneous to the query time.

3. A system for providing fine-grained temporal database access in a consistent read environment, comprising:

a database engine tracking transactions committed to the database as successive consistent versions, each committed transaction generating a further consistent version of the database at a journaled commit time;

a rollback mechanism storing transaction table entries for each uncommitted transaction, each transaction table entry storing retained data values reflecting database changes;

a consistent read mechanism maintaining the transaction table entries for a retention period following the commit time of each transaction and presenting a logical view of the database as of a query time occurring prior to the commit time of at least one transaction by accessing the retained data values stored in the transaction table entries for the at least one transaction;

the rollback mechanism storing the retained data values into transaction table entries for each individual row within the database effected by an uncommitted transaction.

4. A system according to claim 3, further comprising: the consistent read mechanism generating a logical view of an individual row within the database by accessing the retained data values stored in the transaction table entries for each such transaction having effected that individual row.

5. A system for providing fine-grained temporal database access in a consistent read environment, comprising:

a database engine tracking transactions committed to the database as successive consistent versions, each committed transaction generating a further consistent version of the database at a journaled commit time;

a rollback mechanism storing transaction table entries for each uncommitted transaction, each transaction table entry storing retained data values reflecting database changes;

a consistent read mechanism maintaining the transaction table entries for a retention period following the commit time of each transaction and presenting a logical view of the database as of a query time occurring prior to the commit time of at least one transaction by accessing the retained data values stored in the transaction table entries for the at least one transaction;

the rollback mechanism organizing the transaction table entries as a linked data structure comprising undo entries each storing at least part of the retained data values; and the consistent read mechanism traversing the linked data structure and selectively retrieving the retained data values stored substantially contemporaneous to the query time.

6. A system according to claim 1, further comprising:

the consistent read mechanism determining the query time based on at least one of a standardized time reference, a relative time reference, and a system change number generated by each committed transaction.

7. A system according to claim 1, wherein the data values reflect database changes to an object comprising at least one of an object, cell, row, record, table, window, and schema.

8. A system according to claim 1, wherein the transaction comprises at least one of a select, join, and union database operation.

9. A method for providing fine-grained temporal database access in a consistent read environment, comprising:

transitioning a database into successive consistent versions by tracking transactions committed to the database, each committed transaction generating a further consistent version of the database at a journaled commit time;

storing transaction table entries for each uncommitted transaction, each transaction table entry storing retained data values reflecting database changes;

maintaining the transaction table entries for a user-definable retention period following the commit time of each transaction; and presenting a logical view of the database as of a query time occurring prior to the commit time of at least one transaction by accessing the retained data values stored in the transaction table entries for the at least one transaction.

10. A method according to claim 9, wherein each transaction table entry further comprises a transaction identifier, further comprising:

selectively retrieving the retained data values from the transaction table entries for only those such at least one transaction corresponding to a transaction identifier substantially contemporaneous to the query time.

11. A method for providing fine-grained temporal database access in a consistent read environment, comprising:

transitioning a database into successive consistent versions by tracking transactions committed to the database, each committed transaction generating a further consistent version of the database at a journaled commit time;

storing transaction table entries for each uncommitted transaction, each transaction table entry storing retained data values reflecting database changes;

maintaining the transaction table entries for a retention period following the commit time of each transaction;

presenting a logical view of the database as of a query time occurring prior to the commit time of at least one transaction by accessing the retained data values stored in the transaction table entries for the at least one transaction; and storing the retained data values into transaction table entries for each individual row within the database effected by an uncommitted transaction.

12. A method according to claim 11, further comprising: generating a logical view of an individual row within the database by accessing the retained data values stored in the transaction table entries for each such transaction having effected that individual row.

13. A method for providing fine-grained temporal database access in a consistent read environment, comprising:

transitioning a database into successive consistent versions by tracking transactions committed to the database, each committed transaction generating a further consistent version of the database at a journaled commit time;

storing transaction table entries for each uncommitted transaction, each transaction table entry storing retained data values reflecting database changes;

maintaining the transaction table entries for a retention period following the commit time of each transaction;

presenting a logical view of the database as of a query time occurring prior to the commit time of at least one transaction by accessing the retained data values stored in the transaction table entries for the at least one transaction;

organizing the transaction table entries as a linked data structure comprising undo entries each storing at least part of the retained data values; and traversing the linked data structure and selectively retrieving the retained data values stored substantially contemporaneous to the query time.

14. A method according to claim 9, further comprising:

determining the query time based on at least one of a standardized time reference, a relative time reference, and a system change number generated by each committed transaction.

15. A method according to claim 9, wherein the data values reflect database changes to an object comprising at least one of an object, cell, row, record, table, window, and schema.

16. A method according to claim 9, wherein the transaction comprises at least one of a select, join, and union database operation.

17. A computer-readable storage medium holding code for providing fine-grained temporal database access in a consistent read environment, comprising:

transitioning a database into successive consistent versions by tracking transactions committed to the database, each committed transaction generating a further consistent version of the database at a journaled commit time;

storing transaction table entries for each uncommitted transaction, each transaction table entry storing retained data values reflecting database changes;

maintaining the transaction table entries for a user-definable retention period following the commit time of each transaction; and presenting a logical view of the database as of a query time occurring prior to the commit time of at least one transaction by accessing the retained data values stored in the transaction table entries for the at least one transaction.

18. A storage medium according to claim 17, wherein each transaction table entry further comprises a transaction identifier, further comprising:

selectively retrieving the retained data values from the transaction table entries for only those such at least one transaction corresponding to a transaction identifier substantially contemporaneous to the query time.

19. A computer-readable storage medium holding code for providing fine-grained temporal database access in a consistent read environment, comprising:

transitioning a database into successive consistent versions by tracking transactions committed to the database, each committed transaction generating a further consistent version of the database at a journaled commit time;

storing transaction table entries for each uncommitted transaction, each transaction table entry storing retained data values reflecting database changes;

maintaining the transaction table entries for a retention period following the commit time of each transaction;

presenting a logical view of the database as of a query time occurring prior to the commit time of at least one transaction by accessing the retained data values stored in the transaction table entries for the at least one transaction; and storing the retained data values into transaction table entries for each individual row within the database effected by an uncommitted transaction.

20. A storage medium according to claim 19, further comprising: generating a logical view of an individual row within the database by accessing the retained data values stored in the transaction table entries for each such transaction having effected that individual row.

21. A computer-readable storage medium holding code for providing fine-grained temporal database access in a consistent read environment, comprising:

transitioning a database into successive consistent versions by tracking transactions committed to the database, each committed transaction generating a further consistent version of the database at a journaled commit time;

storing transaction table entries for each uncommitted transaction, each transaction table entry storing retained data values reflecting database changes;

maintaining the transaction table entries for a retention period following the commit time of each transaction;

presenting a logical view of the database as of a query time occurring prior to the commit time of at least one transaction by accessing the retained data values stored in the transaction table entries for the at least one transaction;

organizing the transaction table entries as a linked data structure comprising undo entries each storing at least part of the retained data values; and traversing the linked data structure and selectively retrieving the retained data values stored substantially contemporaneous to the query time.

22. A storage medium according to claim 17, further comprising:

determining the query time based on at least one of a standardized time reference, a relative time reference, and a system change number generated by each committed transaction.

23. A system for selectively viewing temporal row data in a consistent read-implemented database, comprising:

a database engine tracking committed transactions effecting row data changes to a database, assigning a stored system change number upon each committed transaction, and transitioning the database into successive consistent versions responsive to each committed transaction at a journaled commit time;

a storage storing rollback segments for uncommitted transactions, each rollback segment storing a transaction identifier and transaction table entries containing ordered row data values reflecting the database changes;

a rollback mechanism maintaining the transaction table entries for a user-definable retention period following the commit time of each committed transaction;

a consistent read mechanism performing a queried selection of row data values from the database as of a query time occurring prior to the commit time of at least one committed transaction and retrieving the ordered row data values contained in the rollback segments storing a transaction identifier for the at least one committed transaction.

24. A system according to claim 23, further comprising:

the storage storing information pertaining to effecting or restoring the database changes into each rollback segment.

25. A system according to claim 23, further comprising:

the consistent read mechanism selecting the transaction table entries as of the query time by at least one of the commit time and the system change number.

26. A method for selectively viewing temporal row data in a consistent read-implemented database, comprising:

tracking committed transactions effecting row data changes to a database and assigning a stored system change number upon each committed transaction;

storing rollback segments for uncommitted transactions, each rollback segment storing a transaction identifier and transaction table entries containing ordered row data values reflecting the database changes;

transitioning the database into successive consistent versions responsive to each committed transaction at a journaled commit time;

maintaining the transaction table entries for a user-definable retention period following the commit time of each committed transaction;

performing a queried selection of row data values from the database as of a query time occurring prior to the commit time of at least one committed transaction; and retrieving the ordered row data values contained in the rollback segments storing a transaction identifier for the at least one committed transaction.

27. A method according to claim 26, further comprising:

storing information pertaining to effecting or restoring the database changes into each rollback segment.

28. A method according to claim 26, further comprising:

selecting the transaction table entries as of the query time by at least one of the commit time and the system change number.

29. A computer-readable storage medium holding code for selectively viewing temporal row data in a consistent read-implemented database, comprising:

tracking committed transactions effecting row data changes to a database and assigning a stored system change number upon each committed transaction;

storing rollback segments for uncommitted transactions, each rollback segment storing a transaction identifier and transaction table entries containing ordered row data values reflecting the database changes;

transitioning the database into successive consistent versions responsive to each committed transaction at a journaled commit time;

maintaining the transaction table entries for a user-definable retention period following the commit time of each committed transaction;

performing a queried selection of row data values from the database as of a query time occurring prior to the commit time of at least one committed transaction; and retrieving the ordered row data values contained in the rollback segments storing a transaction identifier for the at least one committed transaction.

30. A storage medium according to claim 29, further comprising:

storing information pertaining to effecting or restoring the database changes into each rollback segment.

31. A storage medium according to claim 29, further comprising:

selecting the transaction table entries as of the query time by at least one of the commit time and the system change number.

32. A system for performing a logical select operation on temporal row data stored in a consistent read-implemented database, comprising:

a record of database operations comprising transactions effecting row data changes that have been committed into a database;

stored rollback segments for uncommitted transactions, each rollback segment storing a transaction identifier and information pertaining to effecting or restoring the database changes, including addresses for undo entries containing row data values reflecting the database changes;

a database engine transitioning the database into successive consistent database versions responsive to each committed transaction at a journaled commit time and assigning a system change number to the database version upon each committed transaction;

a rollback mechanism retaining the transaction table entries for a user-definable retention period following the commit time of each committed transaction;

a query engine executing a logical select operation on the database for row data values as of a query time occurring prior to the commit time of at least one committed transaction; and a consistent read mechanism retrieving the ordered row data values stored in the undo entries by referencing the undo block at each address included in the interested transaction entry with the transaction identifier for the at least one committed transaction.

33. A method for performing a logical select operation on temporal row data stored in a consistent read-implemented database, comprising:

maintaining a record of database operations comprising transactions effecting row data changes that have been committed into a database;

storing rollback segments for uncommitted transactions, each rollback segment storing a transaction identifier and information pertaining to effecting or restoring the database changes, including addresses for undo entries containing row data values reflecting the database changes;

transitioning the database into successive consistent database versions responsive to each committed transaction at a journaled commit time and assigning a system change number to the database version upon each committed transaction;

retaining the transaction table entries for a user-definable retention period following the commit time of each committed transaction;

executing a logical select operation on the database for row data values as of a query time occurring prior to the commit time of at least one committed transaction; and retrieving the ordered row data values stored in the undo entries by referencing the undo block at each address included in the interested transaction entry with the transaction identifier for the at least one committed transaction.

34. A method for processing data, comprising:

receiving a query requesting temporal access of data and specifying a time prior to a commit time of a transaction that modified the data;

reconstructing the data as of the time prior to the commit time of the transaction that modified the data; and completing processing the query based on the reconstructed data.

35. A method according to claim 34, wherein the time is specified by means of a standardized time reference.

36. A method according to claim 34, wherein the time is specified to be relative to a standardized time reference.

37. A method according to claim 34, wherein the time is specified by means of a system change number.

38. A computer-readable medium bearing instructions for processing data, wherein the instructions are arranged to cause a computer system, upon execution thereof, to perform the steps of the method according to claim 34.

39. A system for processing data, comprising:

a database server configured to receive a query requesting temporal access of data and specifying a time prior to a commit time of a transaction that modified the data;

a rollback mechanism configured to reconstruct the data as of the time prior to the commit time of the transaction that modified the data; and a query engine configured to complete processing the query based on the reconstructed data.

40. A system according to claim 39, wherein the time is specified by means of a standardized time reference.

41. A system according to claim 39, wherein the time is specified to be relative to a standardized time reference.

42. A system according to claim 39, wherein the time is specified by means of a system change number.

43. A method for processing data, comprising: receiving a query requesting access of data existing as of a time specified by the query; wherein the time specified is a wall clock time or a time interval relative to a current wall clock time and prior to a commit time that modified the data; obtaining the data as of the time; and completing processing the query based on the obtained data.

* * * * *